July 2, 1935.  A. M. BARRETT ET AL  2,006,623
METHOD OF AND APPARATUS FOR MAKING ICE
Filed April 2, 1932  3 Sheets-Sheet 1

Inventors:
Arthur M. Barrett,
Louis N. Udell,
By Fisher, Clapp, Soans & Pond,
Attys.

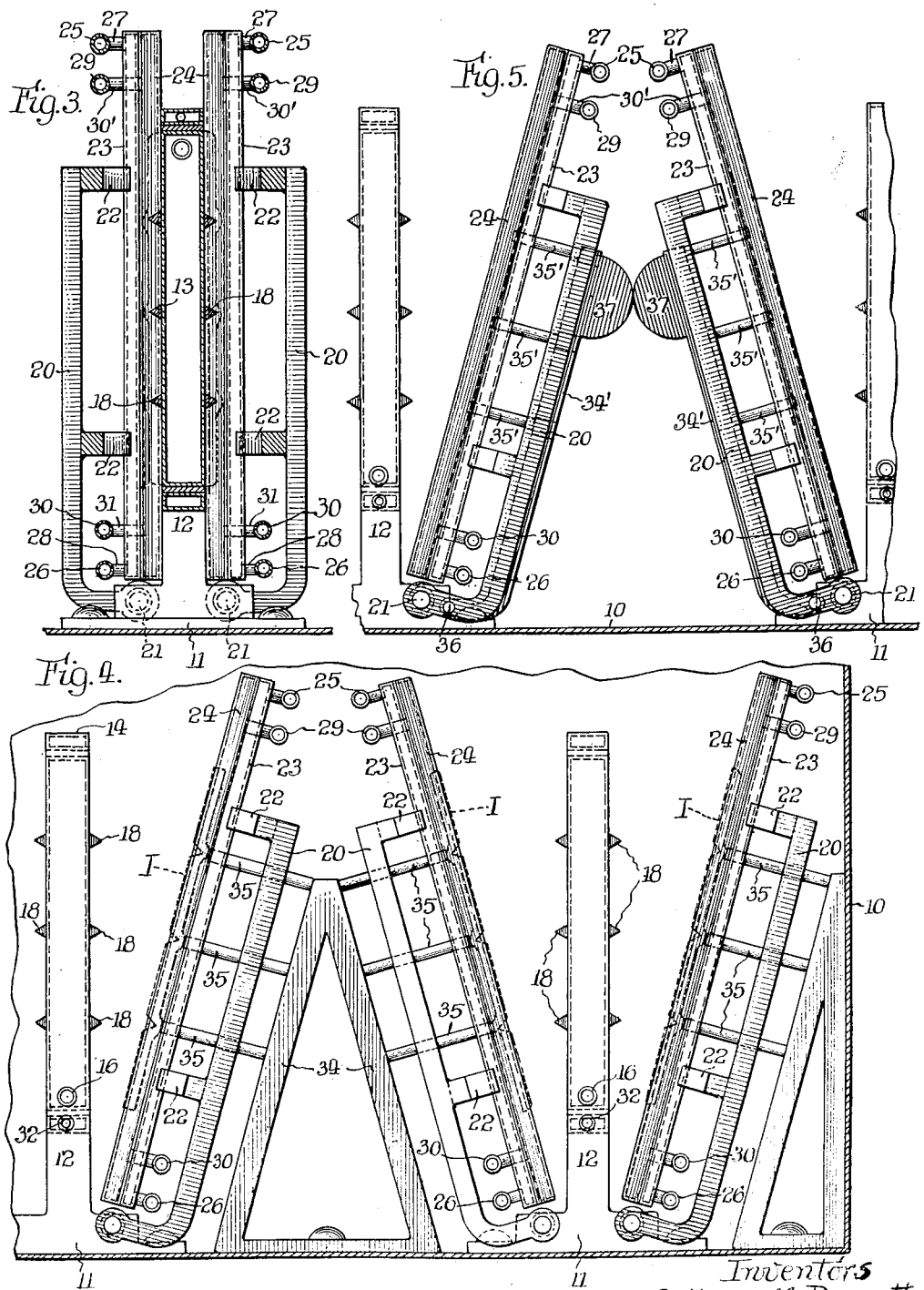

Inventors:
Arthur M. Barrett,
Louis N. Udell,
By Fisher, Clapp, Soans & Pond
Attys.

Patented July 2, 1935

2,006,623

UNITED STATES PATENT OFFICE 2,006,623

METHOD OF AND APPARATUS FOR MAKING ICE

Arthur M. Barrett and Louis N. Udell, Chicago, Ill.

Application April 2, 1932, Serial No. 602,654

17 Claims. (Cl. 62—105)

This invention relates to methods of and apparatus for making ice, and, in its chief intended application, to a method of and apparatus for forming ice in thin blocks or sheets which, on being thawed loose from the freezing surface or surfaces, are ribbed or scored, or both, in such a manner that the blocks or sheets will readily fracture along the scored or ribbed lines, so that, in the ultimate form of the ice product, chips will result having a predetermined generally uniform size and shape.

Generally described, an apparatus embodying the present invention consists of two principal parts, a hollow freezing body of heat conducting material, preferably taking the form of a hollow plate, which may be stationary, and a grid that is movable toward and from the hollow freezing member and is equipped with spaced portions, preferably in the form of hollow ribs, that, during the ice forming period, lie substantially in contact with a surface of the hollow freezing body. These parts are submerged in a tank of water. Means are provided for supplying first a freezing medium and then a thawing medium to the interior of the hollow freezing member, and also a warming medium to the interior of the hollow ribs of the grid in order to either free the block or sheet of ice from said ribs after it has formed thereon, or prevent the block or sheet of ice from freezing to said ribs; the scored or ribbed sheet then rising to the surface of the water in the tank, when it may then be readily broken into chips of substantially uniform size and shape.

An apparatus well adapted to the carrying out of the present invention is illustrated in the accompanying drawings, in which—

Fig. 3 is a vertical transverse section of the freezing unit.

Fig. 4 is a vertical transverse section showing a pair of adjacent units with their grids swung to release position and also showing a device for dislodging the formed ice sheet or block from the grid.

Fig. 5 is a view similar to Fig. 4, showing a slightly modified sheet dislodging device.

Figure 1:
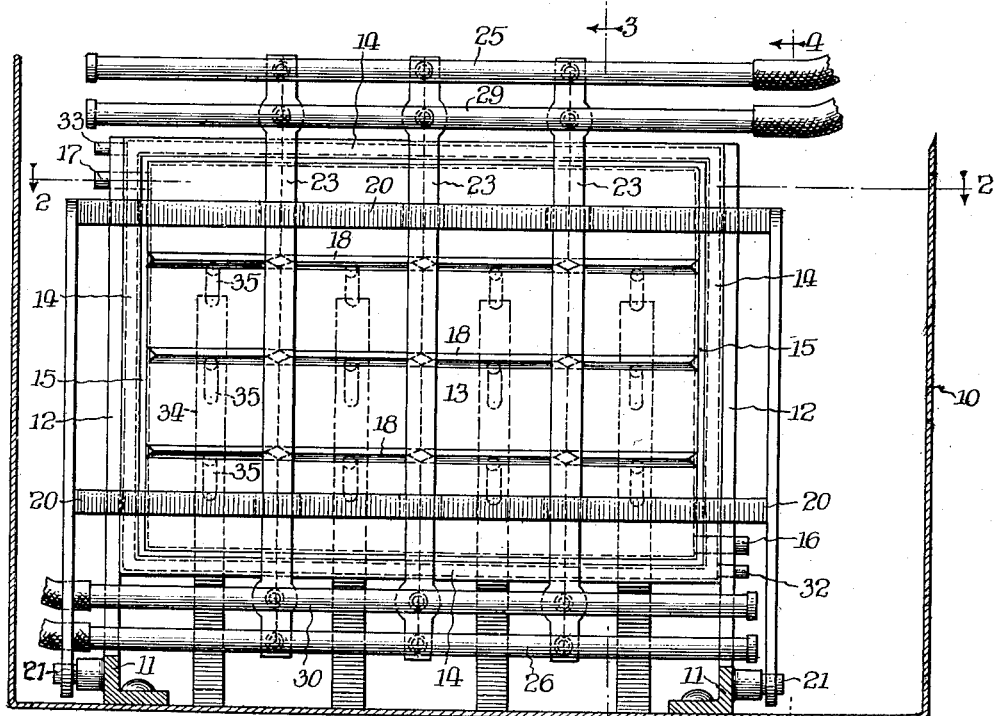
Fig. 1 is a side elevation of one unit, with the tank in which it is submerged shown in vertical transverse section.

Referring to the drawings, 10 designates as an entirety a generally rectangular water tank in which one or more of the freezing units are submerged. Since these freezing units, where two or more are employed, are identical, a description of a single unit will suffice. Attached to the bottom of the tank 10 are a pair of spaced brackets 11, continuous with which are narrow vertical uprights 12, between which is mounted a hollow freezing plate 13 which may be of steel, copper, brass or any other heat-conducting material. Surrounding the edges of the hollow plate 13 is a hollow jacket 14, and between the jacket and the edge walls of the hollow plate is an insulating strip 15. 16 designates a tube which may serve as either an inlet or outlet for freezing and thawing mediums to the interior of the hollow plate 13, and 17 designates a similar tube which may serve as either an outlet or inlet for such freezing and thawing mediums. These tubes 16 and 17 may also serve as supports for the hollow plate from the uprights 12, or the hollow plate may be otherwise secured to said uprights. Formed integral with, or welded or otherwise secured to, the opposed flat outer surfaces of the hollow plate 13 are uniformly spaced transversely extending ribs 18, formed at uniformly spaced distances with transverse breaks or V-shaped notches 19, for a purpose hereinafter disclosed.

Located opposite to, and movable toward and from, the opposite flat sides of the hollow plate 13 are a pair of grid-like structures which, in the instance shown, comprise frames 20 that are pivoted at 21 to the brackets 11, and on their inner sides are equipped with short inwardly extending vertically grooved lugs 22 that form seats for a plurality of uniformly spaced flues 23; and soldered, or otherwise secured to the inner faces of the flues 23 are a corresponding group of hollow generally V-shaped ribs 24. By reference to Fig. 2 it will be observed that when the grids 20 are swung to the upright position shown in Figs. 2 and 3, the hollow ribs 24 intersect the ribs 18 on the hollow plate, entering the breaks or notches 19 and at their tips lying substantially in contact with the outer surfaces of the hollow plate, so that, when the latter is filled with a freezing medium, the freezing temperature is imparted by conduction to both the ribs 18 and 24.

In the operation of the apparatus, a warming medium, preferably a non-freezing medium at a temperature above freezing, is circulated through the flues 23 to prevent formation of ice in a direction away from the surface of the plate 13 beyond the hollow ribs 24. For the supply of such a warm medium, we provide upper and lower header pipes 25 and 26 extending transversely of the upper and lower ends of the flues 23 and connected into the latter by short pipes 27 and 28. After the sheet of ice has been formed, in order to release the latter from the hollow ribs 24, we provide means for circulating a thawing medium through said hollow ribs, such means, in the instance shown, consisting of upper and lower transversely extending pipes 29 and 30 that are connected into the hollow ribs by short pipes 30' and 31.

By means of pipes 32 and 33, either of which may serve as an inlet and the other as an outlet, a warming medium is circulated through the jacket 14 in order to prevent the formation of ice around the edge portions of the hollow freezing plate 13 where it might interfere with the release of the ice sheet from the plate.

One mode of operating the unit, as thus far described, is substantially as follows.

Figure 2:
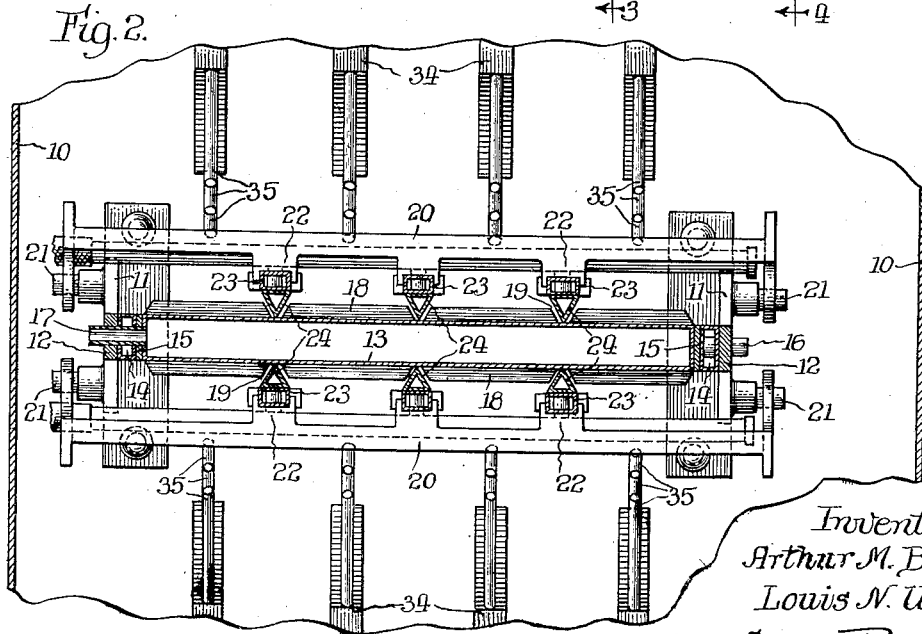
Fig. 2 is a plan section, taken on the line 2—2 of Fig. 1.

The grids 20 are first swung upwardly into a position generally parallel to the hollow freezing plate 13, as shown in Figs. 1, 2 and 3, wherein the inner edges of the ribs 24 lie substantially in contact with the sides of the hollow plate 13, and, the tank having been filled with water, a freezing medium is then circulated through the freezing plate 13. A non-freezing medium at a temperature above freezing is circulated continually through the flues 23, and this, as above stated, prevents ice forming on the grids outwardly beyond the hollow ribs 24. During the period of forming ice on the surfaces of the hollow plate there is no circulation through the hollow ribs 24, thereby permitting the ice to form both on the surfaces of the hollow plate and on the hollow ribs. When the desired thickness of ice has formed on the hollow plate, the freezing medium is withdrawn from the latter and a medium above freezing is then circulated through the hollow plate, thus thawing the ice free therefrom. The grids are then swung away from the hollow plate, as shown in Fig. 4, taking the sheet of ice with them, said sheet being shown by dotted lines in Fig. 4 and identified by the reference letter I. A thawing medium is then circulated through the hollow ribs 24, which releases the ice sheet, and the latter floats to the surface of the water in which the entire assembly is submerged. The presence of the ribs 18 and 24 causes the sheet of ice to be scored along intersecting horizontal and vertical lines, so that it may be readily broken into chips of substantially uniform size and shape, for the numerous uses to which chip ice is put.

The apparatus as thus far described, is complete for the practical purposes of the invention; but in order to insure the complete freeing of the ice sheet from the grid at the conclusion of the freezing operation, we may also employ auxiliary mechanical means for dislodging the sheet from the grid. Such means as shown in Fig. 4 may comprise a stationary frame 34 attached to the bottom wall of the tank and equipped with laterally projecting fingers 35 that are so located that, as the grid is swung outwardly, the ends of these fingers will strike the sheet of ice preferably at the ribs on the latter formed by the ribs 18 of the freezing plate, and will thus effectively dislodge the sheet of ice from the grid. Instead of employing a stationary frame to carry the said fingers, we may, as shown in Fig. 5, employ an auxiliary frame 34' pivoted at its lower end at 36 on the main grid frame 20 and carrying fingers 35'. In actual practice, for the sake of economy, a number of the freezing units are located side by side in a common tank; and when so located, the backs of the hinged auxiliary frames 34' may be provided with cooperating bumpers 37, as shown in Fig. 5, which, through contact with each other mutually support the frames 34' in operative position.

The ribs 18 on the opposed surfaces of the hollow freezing plate 13 are in effect parts of the freezing surfaces of said hollow plate, and they may be employed or omitted, depending on the size of the ultimate product of the apparatus.

A modification of the mode of operation above described may be used, as follows. During freezing, a warm fluid may be flowed through the hollow ribs 24, thus preventing the ice from adhering to the grid. When the freezing is complete, the grid is moved away, warm fluid is then circulated through the hollow freezing plate, and the ice sheet is thus freed therefrom and floats to the surface. This mode of operation renders unnnecessary the mechanical fingers 35 or 35' for fully dislodging the ice from the grid.

Figure 6:
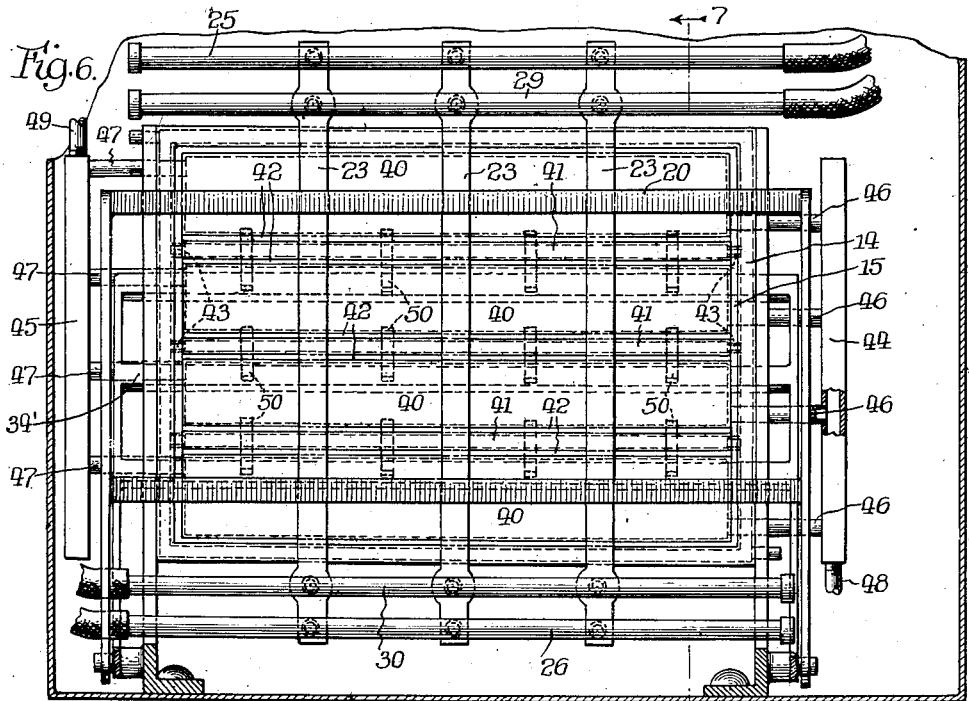
Fig. 6 is a view similar to Fig. 1, partly in section on line 6—6 of Fig. 7, showing a modified form of hollow freezing plate.
Figure 7:
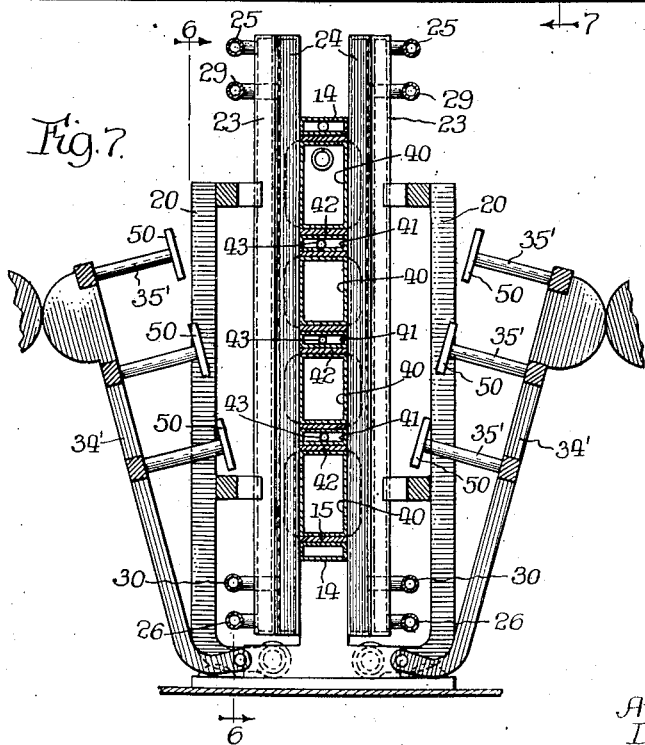
Fig. 7 is a vertical section on line 7—7 of Fig. 6.

In Figs. 6 and 7 we illustrate an apparatus employing a modified form of freezing plate that is substantially similar to a freezing plate disclosed and claimed in our copending application Serial 578,922, filed December 4, 1931, and now issued as Patent No. 1,936,575, dated November 28, 1933, and consisting, broadly, of a plurality of superposed longitudinal hollow slabs with interposed hollow conductors for the flow of a warming medium which prevents the formation of ice on the hollow plate along lines lying opposite said hollow conductors, so that the ice, instead of being formed in a single scored sheet on the freezing plate, is formed in a plurality of separated strips or sheets.

Briefly describing this modification, 40 designates each of a plurality of hollow slabs that are superposed on each other and separated by intermediate narrow hollow conductors 41, with insulating strips 42 interposed between the adjacent sides of the members 40 and 41. The narrow sides of the conductors 41 are preferably flush with the outer surfaces of the hollow slabs 40, as shown in Fig. 7, and the hollow conductors 41 are supplied with a warming medium from the warming jacket 14 by ports 43 in their ends communicating with opposite limbs of said jacket.

The freezing and thawing mediums are supplied to the several hollow slabs 40 by means of headers 44 and 45 that communicate with the hollow slabs through pipes 46 and 47 respectively. Manifestly either header may serve for the inflow, and the other for the outflow, but in the arrangement shown the medium preferably enters by way of the header 44 and passes out by way of the header 45, a supply pipe 48 being connected into the lower end of the header 44 and a discharge pipe 49 being connected into the upper end of the header 45. The narrow longitudinal sides of the hollow heating strips 41, which, as stated, lie substantially flush with and in effect form parts of the outer surfaces of the hollow freezing plate, are maintained at a non-freezing temperature during the ice forming period, so that no ice forms on these narrow strips.

In association with this form of freezing plate, we may employ the same pivoted grids 20, carrying the same hollow V-shaped ribs 24 and flues 23, and supply pipes therefor, as previously described in connection with Figs. 1 to 5.

We have also illustrated, in connection with this form of the apparatus, mechanical devices for dislodging the ice from the grids similar to those shown and described in connection with Fig. 5, with the addition of short transverse contact strips 50 on the free ends of the fingers 35', each contact strip 50 being long enough to strike the lower portion of one strip of ice and the upper portion of the next underlying strip of ice, when the grid is swung rearwardly.

This equipment may be operated in either of the ways above described. When operated in the manner first described, that is, with no warming medium circulating through the hollow ribs 24 during the ice forming period, the ice forms in separate longitudinal strips or sheets on the outer sides of the several hollow slabs of the freezing plate, as indicated by dotted lines in Fig. 7, these strips or sheets adhering to the ribs 24, and being then freed from the ribs either by circulating a thawing medium through the latter, or by contact with the strips 50, or by both. When operated in the second described manner, that is, with a warming medium circulating through the ribs 24 during the ice forming period, the ice forms as small sheets or chips on the outer sides of the several hollow slabs, which sheets or chips are freed by subsequently flowing a thawing medium through the hollow slabs alone. To free these sheets or chips and permit them to readily rise to the surface of the water the grids are preferably swung away. When operating in this manner, the mechanical dislodging devices are not needed, and may be omitted.

The warming or thawing medium used in the ribs 24 and flues 23 may consist of an electric current passed through suitable heating devices in said parts.

We have herein shown and described practical forms or embodiments of the principle of our invention, well adapted to effectuate the stated purposes and objects thereof; but it is manifest that the structural details may be widely varied without departing from the operative principle of the invention or sacrificing any of the benefits and advantages secured thereby. Hence, we do not limit the invention to the structural details herein set forth, but reserve all such variations, modifications and mechanical equivalents as fall within the spirit and purview of the appended claims.

We claim:

1. Apparatus for making ice, comprising, in combination, a hollow body of heat conducting material, means for supplying freezing and thawing mediums to the interior of said body, and a pivoted grid adapted to swing toward and from a surface of said body, said grid having spaced members movable into parallelism with said surface and serving to divide portions of the block of ice formed on said surface lying laterally adjacent to said members.

2. Apparatus for making ice, comprising, in combination, a hollow body of heat conducting material, means for supplying freezing and thawing mediums to the interior of said body, a pivoted grid adapted to swing toward and from a surface of said body, said grid having spaced members serving to score the body of ice formed on said surface and to which members the body of ice formed on said surface may adhere during the ice forming period, and bumper means for freeing the ice from said grid.

3. Apparatus or making scored and ribbed sheet ice, comprising, in combination a hollow plate of heat conducting material having ribs on a surface thereof, means for supplying freezing and thawing mediums to the interior of said plate, and a grid relatively movable toward and from said plate, said grid having scoring ribs lying substantially in contact with the ribbed surface of said plate and intersecting the ribs of the latter during the ice forming period.

4. Apparatus for making scored and ribbed sheet ice, comprising, in combination a hollow plate of heat conducting material having ribs on a surface thereof, means for supplying freezing and thawing mediums to the interior of said plate, a grid relatively movable toward and from said plate, said grid having scoring ribs lying substantially in contact with the ribbed surface of said plate and intersecting the ribs of the latter during the ice forming period, and means for freeing the sheet of ice from said grid.

5. Apparatus for making scored sheet ice, comprising, in combination, a hollow plate of heat conducting material, means for supplying freezing and thawing mediums to the interior of said plate, a grid relatively movable toward and from said plate, said grid having hollow scoring ribs lying substantially in contact with an external surface of said plate during the ice forming period, and means for circulating a thawing medium through said hollow ribs.

6. Apparatus for making scored and ribbed sheet ice, comprising, in combination, a hollow plate of heat conducting material having ribs on a surface thereof, means for supplying freezing and thawing mediums to the interior of said plate, a grid relatively movable toward and from said plate, said grid having hollow scoring ribs lying substantially in contact with the ribbed surface of said plate and intersecting the ribs of the latter during the ice forming period, and means for circulating a thawing medium through said hollow ribs.

7. Apparatus for making scored sheet ice, comprising, in combination, a hollow plate of heat conducting material, means for supplying freezing and thawing mediums to the interior of said plate, a grid relatively movable toward and from said plate, said grid having hollow scoring ribs lying substantially in contact with an external surface of said plate and flues behind said ribs, means for circulating a thawing medium through said hollow ribs, and means for circulating a warming medium through said flues to prevent the formation of ice in a direction away from said hollow plate beyond said hollow ribs.

8. Apparatus for making scored sheet ice, comprising, in combination, a hollow plate of heat conducting material, means for supplying freezing and thawing mediums to the interior of said plate, a grid relatively movable toward and from said plate, said grid having hollow scoring ribs lying substantially in contact with an external surface of said plate to which the sheet of ice formed on said surface adheres during the ice forming period, means for circulating a thawing medium through said hollow ribs, a jacket bounding the edges of said hollow plate, and means for circulating a warming medium through said jacket.

9. Apparatus for making scored sheet ice, comprising, in combination, a hollow plate of heat conducting material, means for supplying freezing and thawing mediums to the interior of said plate, a grid relatively movable toward and from said plate, said grid having hollow scoring ribs lying substantially in contact with an external surface of said plate and flues behind said ribs, means for circulating a thawing medium through said hollow ribs, means for circulating a warming medium through said flues to prevent the formation of ice in a direction away from said hollow plate beyond said hollow ribs, a jacket bounding the edges of said hollow plate, and means for circulating a warming medium through said jacket.

10. Apparatus for making sheet ice, comprising, in combination, a hollow plate of heat conducting material, means for supplying freezing and thawing mediums to the interior of said plate, a grid relatively movable toward and from said plate, said grid having spaced members to which the sheet of ice formed on a surface of said plate opposite said grid adheres during the ice forming period, and a group of fingers behind said grid serving through contact with the sheet of ice on said grid to dislodge said sheet of ice from said grid as the latter is moved away from said hollow plate.

11. Apparatus for making scored sheet ice, comprising, in combination, a hollow plate of heat conducting material, means for supplying freezing and thawing mediums to the interior of said plate, a pivoted grid adapted to swing toward and from said plate, said grid having hollow scoring ribs lying substantially in contact with an external surface of said plate to which the sheet of ice formed on said surface adheres during the ice forming period, means for circulating a thawing medium through said hollow ribs, and a group of stationary fingers behind said grid adapted to dislodge the sheet of ice from said ribs as said grid is swung away from said hollow plate.

12. In ice making apparatus, the combination of a freezing member consisting of a hollow body of heat conducting material, means for supplying freezing and thawing mediums to the interior of said body, heating strips dividing a wall of said body into a plurality of freezing surfaces, means for heating said strips, and a grid relatively movable toward and from said body, said grid having spaced members serving to divide portions of the blocks of ice formed on said body lying laterally adjacent to said members.

13. In ice making apparatus, the combination of a hollow freezing plate, means for supplying freezing and thawing mediums to the interior of said plate, heating strips dividing a wall of said plate into a plurality of freezing surfaces, means for heating said strips, and a grid relatively movable toward and from said wall, said grid having spaced ribs crossing said heating strips and serving to divide portions of the blocks of ice formed on said wall lying laterally adjacent to said ribs.

14. In ice making apparatus, the combination of a freezing member consisting of a plurality of hollow slabs placed edge to edge with interposed conductors for a heating medium having their opposite edges substantially flush with the opposite surfaces of said slabs, means for supplying freezing and thawing mediums to said slabs, means for supplying a heating medium to said conductors, a pair of grids relatively movable toward and from opposite sides of said freezing member, said grids having spaced hollow ribs crossing said conductors and serving to divide portions of the blocks of ice formed on the opposite surfaces of said slabs lying laterally adjacent to said ribs, and means for supplying a heating medium to said ribs.

15. A method of making scored sheet ice, which consists in immersing in a body of water a freezing plate and a relatively movable grid having spaced parts thereof lying substantially in contact with a surface of said plate, subjecting said plate to a freezing temperature to thereby form a sheet of ice on said surface, separating said plate and grid, and then subjecting said plate to a thawing temperature to thereby free the sheet of ice therefrom and permit the same to float to the surface of said body of water.

16. A method of making scored sheet ice, which consists in immersing in a body of water a freezing plate and a relatively movable grid having spaced ribs lying substantially in contact with the surface of said plate, subjecting said plate to a freezing temperature to thereby form a sheet of ice thereon and simultaneously subjecting said ribs to a thawing temperature to prevent the adhering of ice thereto, separating said plate and grid, and then subjecting said plate to a thawing temperature to thereby free the sheet of ice therefrom and permit the same to float to the surface of said body of water.

17. Apparatus for making scored sheet ice, comprising, in combination, a freezing plate equipped with ribs on a surface thereof, and a relatively movable grid having spaced ribs disposed at an angle to said first-named ribs and lying substantially in contact with said surface, one group of said ribs being notched to accommodate the ribs of the other group, means for subjecting said plate and all said ribs to a freezing temperature to thereby form a sheet of ice adhering to said surface and ribs, means for subjecting said plate to a thawing temperature to free the sheet of ice therefrom, and means for subjecting the ribs of said grid to a thawing temperature.

ARTHUR M. BARRETT.
LOUIS N. UDELL.